Feb. 11, 1964 R. L. SAMSON 3,121,200

A.C. DIODE FUNCTION GENERATOR

Filed Aug. 27, 1959 2 Sheets-Sheet 1

INVENTOR.
RALPH L. SAMSON

BY Norbert Ederer
his attorney

A.C. DIODE FUNCTION GENERATOR

Filed Aug. 27, 1959 2 Sheets-Sheet 2

INVENTOR.
RALPH L. SAMSON
BY Norbert Ederer
his attorney

United States Patent Office — 3,121,200 — Patented Feb. 11, 1964

3,121,200

A.C. DIODE FUNCTION GENERATOR

Ralph L. Samson, Wyckoff, N.J., assignor to Curtiss-Wright Corporation, a corporation of Delaware Filed Aug. 27, 1959, Ser. No. 836,472
5 Claims. (Cl. 328—143)

This invention relates to electronic function generators, and more particularly to electronic method and means for generating an alternating sinusoidal output voltage whose magnitude is a predetermined function of the magnitude of an alternating sinusoidal input voltage.

Several methods for generating alternating signal functions have been known heretofore. One prior approach utilies electro-mechanical position servo mechanisms wherein the servo motor actuates the slider of a specially contoured potentiometer for derivation of the desired function, the potentiometer being energized by an alternating voltage. Another electro-mechanical method for generating alternating signal functions is based on the principle of change in amplification of an amplifier in response to attainment of a predetermined level of input voltage. The change in amplification is brought about by the change in state of energization of a relay; an additional amplifier or stage of amplification or input or feedback resistor is inserted into the system by the transfer of the relay contacts.

In many applications, particularly in high speed analog computing equipment, the electro-mechanical function generators are objectionable principally because not sufficiently fast in response and also because they are physically of large size. Jurely electronic function generating means are desirable for such applications, and in fact have been provided to limited extent heretofore. One such electronic function generator is the limiter, which is effective to amplify the incoming input signal linearly up to a predetermined threshold level, and thereafter to clip the same symmetrically thereby ultimately converting the sign wave to a square wave. The sinusoidal wave shape is restored by means of a low pass or band pass filter. A principal shortcoming of the limiter resides in the phase shift introduced by the filter which is apt to vary with aging or drift in the signal frequency. Another function generator, which has essentially the same input-output characteristic as the limiter, is an amplifier with automatic gain control. Here the output signal is rectified and filtered, and the resultant D.C. voltage is applied as a bias control voltage to change the amplification. This arrangement is likewise subject to drift due to ageing of amplifier tubes, for example. Also the two just described electronic function generators are limited to produce but the one limiter function, which may be insufficient for many applications.

Accordingly it is a general object of the present invention to overcome the disadvantages of alternating signal function generators of the prior art.

It is a further object of the invention to provide electronic function generating means capable of generating a variety of input-output characteristics.

A still further object of the invention is the provision of simple, compact and inexpensive function generating means that may be readily integrated into existing analog computing equipment.

The present invention contemplates apparatus that bears a certain analogy to diode function generators used in systems employing direct signal voltages, as for example as described in Patent No. 2,832,886. In the direct voltage function generator diodes are utilized to provide additional signal transmission paths or additional signal diversion paths when a signal level, determined by a diode bias voltage, is attained. In accordance with the present invention I provide a pair of half wave or full wave rectified sinusoidal bias voltages of opposite polarity to a pair of oppositely poled diodes, which provide additional signal transmission or additional signal diversion when the signal has overcome the bias. The arrangement is such that the two diodes of a given pair conduct during alternate half cycles of the signal. This is feasible by reason of the fact that the bias and signal voltages are in phase or phase opposition to one another.

The invention will be more fully set forth in the following description referring to the accompanying drawings and the features of novelty will be pointed out with particularity in the claims annexed to and forming a part of this specification.

In the drawings:

FIG. 1 is a schematic diagram of alternating signal function generating means according to one embodiment of the invention;

FIGS. 1*a*–1*h* are graphs of input-output characteristics explanatory of the apparatus of FIGS. 1 and 2;

Figure 1:
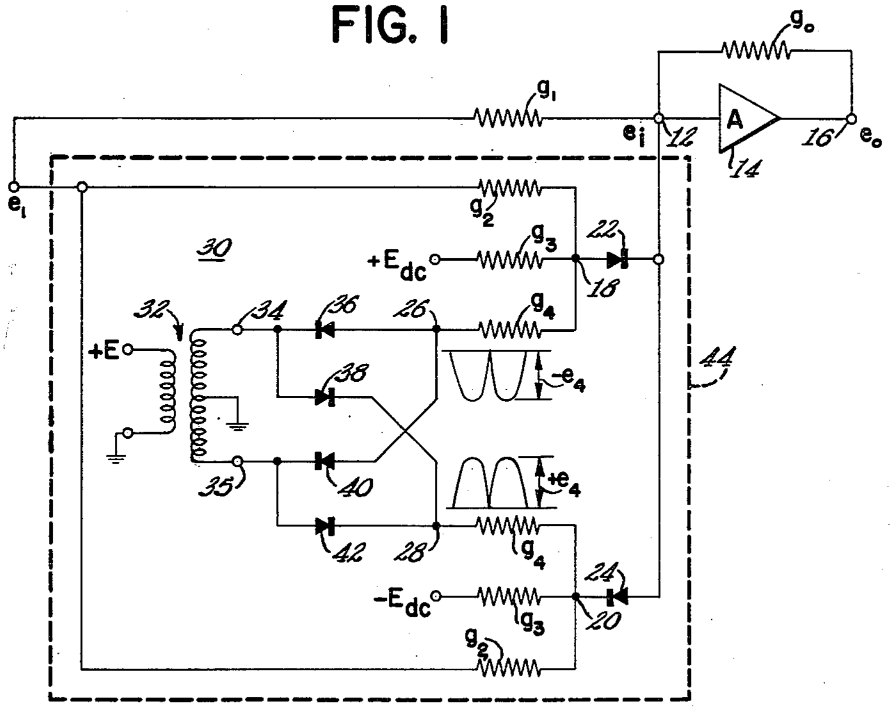
Figure 2:
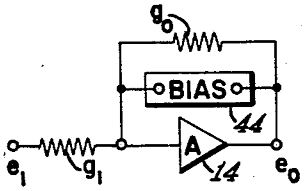
FIG. 2 is a schematic diagram partly in block form of function generating apparatus according to another embodiment of the invention.
Figure 3:
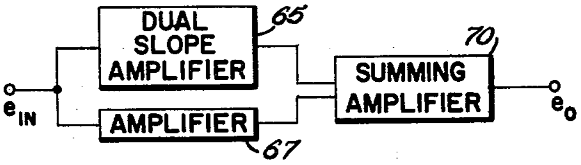
FIG. 3 is a block diagram of function generating apparatus including that of FIGS. 1 and 2 in combination with additional amplifiers adapted to produce further input-output characteristics.
Figure 3A:
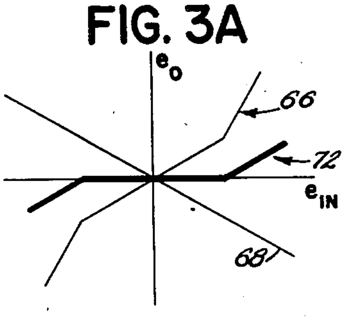
Figure 3B:
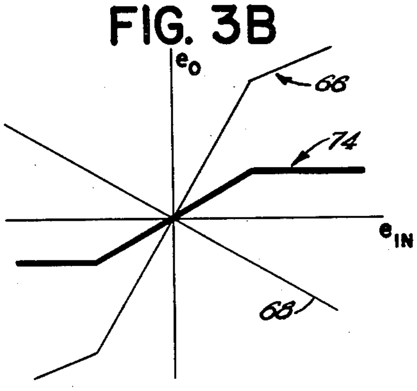
Figure 4:
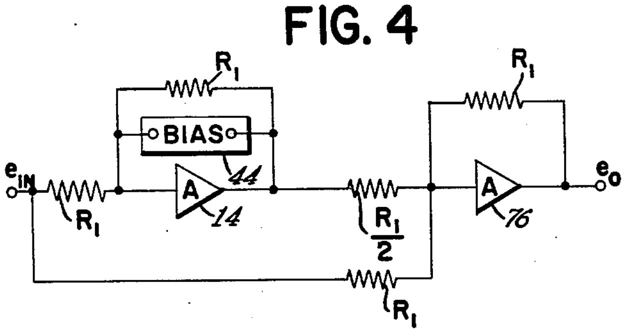
Figure 4A:
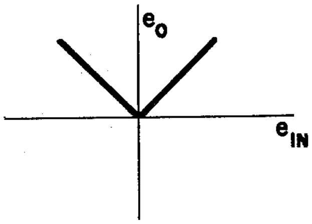

FIGS. 3*a* and 3*b* are graphs illustrating the response of the function generator of FIG. 3;

FIG. 4 illustrates a further combination of the function generating means according to FIGS. 1 and 2 with a further amplifier; and FIG. 4*a* is a graph of the response of the apparatus of FIG. 4.

The circuits of the present invention employ so-called "summing" amplifiers. These amplifiers are linear in the sense of producing output signals that are linear functions of the input signals. A summing amplifier, as is well known, receives one or more input signals $e_1$, $e_2$ . . . $e_n$ which are applied through respective linear resistors $R_1$, $R_2$ . . . $R_n$ to the input summing junction terminal of the amplifier. The terms "input summing junction," "summing junction," "input junction," sometimes followed by "terminal," will be used interchangeably herein. A feedback resistor $R_0$ interconnects the amplifier input and output junctions. The term "output terminal," "output junction terminal" or simply "output" shall be considered interchangeable with the term "output junction" The amplifier is arranged to produce phase reversal from input to output. If the open loop amplifier gain A is high and the magnitude of the feedback resistance $R_0$ is comparable to that of the input resistors, the approximate expression for the output voltage $e_0$ is given as:

$$(1)\qquad e_0=-R_0\left(\frac{e_1}{R_1}+\frac{e_2}{R_2}+\cdots\frac{e_n}{R_n}\right)$$

The present invention is not limited to amplifiers subject to these two restrictions. Therefore it is necessary to consider also the exact formula for the output voltage:

$$(2)\qquad e_0=-\frac{A(e_1g_1+e_2g_2+\ldots e_ng_n)}{(A+1)g_0+e_1g_1+e_2g_2+\ldots e_ng_n}$$

In Equation 2 the input and feedback resistors have been replaced by their reciprocal conductances with corresponding subscripts, to facilitate analysis. The input voltage $e_1$ at the summing junction of the amplifier is $$-\frac{1}{A}$$

times the value of the output voltage $e_0$ obtained from Equations 1 or 2. FIG. 1 illustrates a function generator which for reasons apparent hereinafter will be referred to as a "bilinear" or "dual slope," or more generally "multilinear" or "multiple slope" amplifier. For simplicity, in some instances a signal, a line carrying such signal, an input terminal accepting such signal or an output terminal delivering such signal are deemed to be identified by the same reference character. For example in FIG. 1, signal $e_1$ is deemed to be applied to the system input terminal $e_1$ and then transmitted via a line deemed to be designated $e_1$. Signal $e_1$ is an alternating sinusoidal analog input signal which is applied through input conductance $g_1$ to the summing junction 12 of a summing amplifier 14 from whose output terminal 16 a feedback conductance $g_0$ connects back to the summing junction. Input signal $e_1$ is either in phase with or phase opposition to a reference alternating sinusoidal voltage +E hereinafter encountered. It is further applied through two like valued conductances designated as $g_2$ to circuit junctions 18 and 20 respectively. The junction 18 connects to input summing junction 12 through the anode and the cathode of a diode 22, whereas the junction 20 connects to the summing junction 12 through an oppositely poled diode 24. The cathode of diode 22 and the anode of diode 24 are connected to junction 12 directly. The junctions 18 and 20 are connected through like valued conductances $g_4$ to circuit junctions 26 and 28 respectively.

The indicated unidirectional full wave rectified, balanced half cycle sinusoidal voltages of amplitude $e_4$ are applied to junctions 26 and 28, the former voltage being negative and the latter positive. These voltages serve as bias voltages for the diodes 22 and 24 to inhibit conduction by these diodes until the input signal $e_1$ is of a magnitude sufficient to overcome the bias. A pair of equal and opposite direct bias voltages $+E_{dc}$ and $-E_{dc}$ are applied to the junctions 18 and 20 through a pair of like valued conductances $g_3$ respectively. Provision of the direct voltage bias is not absolutely necessary for proper performance of the circuitry, but serves to assure that the diodes 22 and 24 will conduct for half cycles of the input voltage $e_1$, when the alternating bias has been overcome. Inclusion of the direct voltage bias is desirable, as the voltage axis intercept of semi-conductor diode current-voltage curves is positive. For vacuum diodes the polarities of the direct bias voltages should be inverted, as here the voltage axis intercept is negative. The direct bias voltages cause the point of zero diode alternating current to correspond to the point of zero diode alternating voltage.

The alternating bias voltages are generated by means of a full wave rectifier network 30. This includes a transformer 32 whose primary winding is energized by the reference voltage +E and which is provided with a balanced pair of secondary windings with grounded center tap. Equal and opposite phased output voltages substantially of amplitude $e_4$ are produced at the secondary terminals 34 and 35. The terminal 34 connects through the cathode and then the anode of a diode 36 to the junction 26 and through an oppositely poled diode 38 to the junction 28. The terminal 35 connects through the cathode and then the anode of a diode 40 to the junction 26 and through an oppositely poled diode 42 to the junction 28, thereby providing the alternating bias voltages. The network enclosed within the dashed line block 44 will be referred to as a bias network hereinafter.

The explanation of the operation of the circuitry of FIG. 1 will be facilitated by noting that all sinusoidal voltages considered are in phase with or phase opposition to one another, and by treating the diodes 22 and 24 as switches when conducting and of infinite back resistance when not conducting. The diodes 22 and 24 are assumed to conduct as soon as the potentials at the respective junctions 18 and 20 equal the potential $e_i$ at the summing junction 12. As will be seen, the diodes will conduct if at all, during opposite half cycles of the input voltage $e_1$. Because of the mentioned phase relationship of the voltages encountered, the equality, and also inequality, of the voltage at junction 18 or 20 with that of the junction 12 must necessarily hold true for the entire half cycle under consideration. Therefore whatever is said about the relation of these voltages with reference to the crest of the half cycle will be true during any other time of the half cycle. Accordingly it is merely necessary to compare relations at the crest of any given half cycle and for this reason the multiplying factor $\sin \omega t$ will be omitted. The circuitry is thus seen to behave in a manner analagous to a direct voltage system.

Initially as the input voltage $e_1$ increases from zero amplitude, the diodes 22 and 24 will not conduct, so that the voltage $e_i$ at the summing junction 12 for the positive half cycles of $e_1$ is given, in accordance with Equation 2, by:

$$e_i=\frac{e_1 g_1}{(A+1)g_0+g_1} \tag{3}$$

the multiplying factor $\sin \omega t$ being implicit. This relation is illustrated graphically in FIGS. 1*b* and 1*d* by the heavy solid straight line segments 46. At the same time the build up of voltage during positive half cycles of $e_1$ will be:

$$e_{18}=\frac{-e_4 g_4+e_1 g_2}{g_2+g_3+g_4} \tag{4}$$

at junction 18 and, $$e_{20}=\frac{+e_4 g_4+e_1 g_2}{g_2+g_3+g_4} \tag{5}$$

for junction 20. The voltage $e_{18}$ is the voltage at the junction 18; the same convention applies to the voltage at the junction 20 and other numerically designated junctions. Equations 4 and 5 represented by the parallel straight lines 48 and 50 in both FIG. 1*b* and FIG. 1*d*. The relations for the negative half cycles of $e_1$ may be established by substituting $-e_1$ for $e_1$ in Equations 3, 4 and 5 and are necessarily symmetrical with the roles of the diodes 22 and 24 interchanged. Therefore the considerations applicable to the positive half cycles also govern the performance for the negative half cycles with interchange of the functions of the diodes, and will not be expressly stated except to facilitate understanding where necessary.

Figures 1A, 1B, 1C, 1D, 1E, 1F, 1G, 1H:
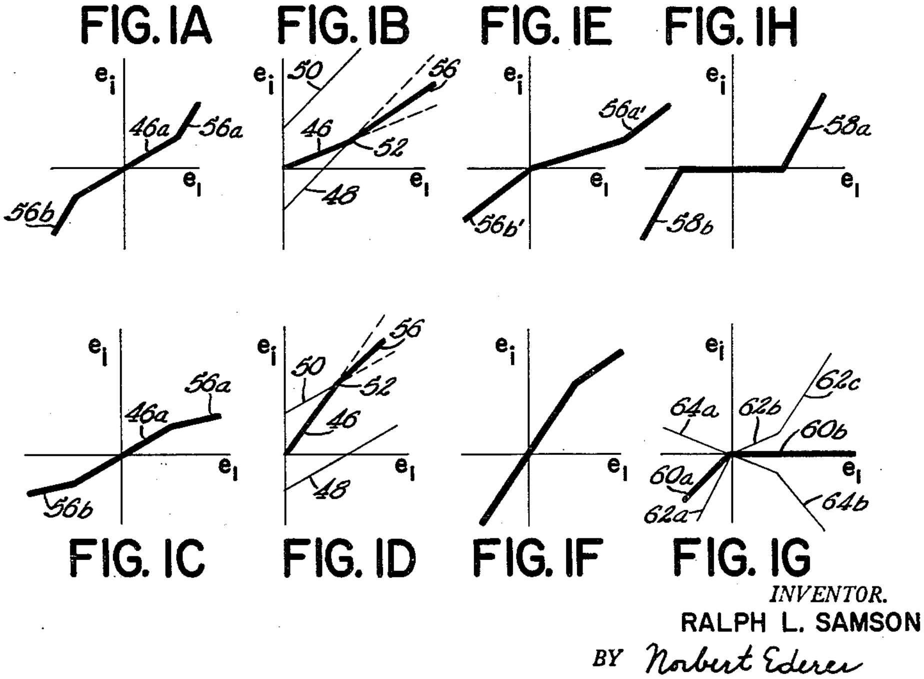

Resuming consideration of the positive half cycles of $e_1$, the circuit performance in accordance with Equations 3, 4 and 5 will continue until $e_i$ equals either $e_{18}$ (FIG. 1*b*) or equals $e_{20}$ (FIG. 1*d*). This depends on whether the slope of line 46 as determined by the circuit constants $g_0$, $g_1$ and A is greater or less than the slope of the straight lines 48 or 50, determined by the circuit constants $g_2$, $g_3$ and $g_4$. There exists a trivial third possibility, namely equal slopes for the graphs 46, 48 and 50. This means physically that the diodes 22 and 24 do not ever conduct, so that the bias network 44 might as well be omitted.

Assuming that the circuit constants are such as to give rise to the relations illustrated in FIG. 1*b*, the point of intersection 52 of the lines 46 and 48 represents a condition of equality of voltages the junctions 12 and 18 and accordingly the diode 22 will conduct during the positive half cycles of $e_1$ while the diode 24 conducts during its negative half cycles. It should be recognized that under the exact relations of voltages according to Equations 2, 3 and 4, the voltage $e_{18}$ is not zero at the "break point" 52, for were this the case the diode 22 still could not conduct. Rather it is necessary that the voltage $e_{18}$ be sufficiently positive to equal $e_i$. Where the circuit constants are such that the approximation of Equation 1 may be used, the break point 52 may with sufficient accuracy be taken as corresponding to $e_{18}=0$. The "break point" 52 is so named because of the break in the amplification characteristic. Up to point 52, the characteristic is defined by straight line 46. Beyond the break point 52, the amplification is greater, being defined by straight line 56.

Onward of the break point 52 the diode 22 will conduct during the positive half cycles of $e_1$ and the voltage $e_i$ will be given by:

$$e_i=\frac{e_1(g_1+g_2)-e_4g_4}{(A+1)g_0+g_1+g_2+g_3+g_4} \quad (6)$$

for the positive half cycles of $e_1$. This relation is plotted in FIG. 1*b* as the heavy solid straight line segment 56. For the negative half cycles Equation 6 still holds provided $e_1$ is replaced by $-e_1$ and $-e_4$ by $+e_4$. It is to be noted that the numerator and denominator of the right hand expression in Equation 6 are respectively the sums of the numerators and denominators appearing in the right hand expressions of Equations 3 and 4. It can be shown that the slope of line 56 is greater than that of line 46 but less than that of lines 48 or 50. Accordingly line 56 cannot intersect line 50, so that there is no further break point, since diode 24 cannot conduct during the positive half cycles. The fact of conduction of diode 22 rather than 24 during positive half cycles of $e_1$ results in increased amplification to the right of break point 52; the diode 22 thus behaves as a "series diode." As will be seen hereinafter in the arrangement represented by FIG. 1*d* diode 24 rather than diode 22 is rendered conductive at the break point and is effective to divert current from the input junction 12, thus behaving as a "shunt diode" to produce a reduction in amplification.

Should the input voltage $e_1$ reverse in phase, exactly the same considerations govern in view of the full wave rectified sinusoidal bias voltages provided; the voltage $e_i$ and consequently the voltage $e_0$ merely reverse in phase. The complete $e_1$ vs. $e_i$ characteristic is illustrated in FIG. 1*a*. It is seen to consist of one straight line segment 46*a* passing through the origin and two straight line segments of like slope displaced symmetrically with respect to the origin and designated as 56*a* and 56*b* respectively. This characteristic gives rise to the designation of bilinear or multilinear, or dual slope or multiple slope amplifier.

Considering the situation where the slope of curve 46 is greater than the slope of the curves 48 and 50 as represented by FIG. 1*d*, here the break point 52 represents the intersection of lines 46 and 50 rather than 46 and 48. When the break point is reached diode 24 conducts to divert current from the input junction. Onward of the break point the summing junction input voltage is given by:

$$e_i=\frac{e_1(g_1+g_2)+e_4g_4}{(A+1)g_0+g_1+g_2+g_3+g_4} \quad (7)$$

resulting in decreased amplification. The numerator and denominator of the right hand expression in Equation 7 are seen to be respectively the sums of the numerators and denominators of the right hand expressions of Equations 3 and 5. Accordingly the slope of line 56 is less than that of line 46 but greater than that of line 50 and 48. Therefore line 56 cannot intersect line 48, so that there can be no further break point, since diode 22 can not conduct during the positive half cycles of $e_1$. Here too a symmetrical response is produced for phase reversal of $e_1$; the complete characteristic is illustrated in FIG. 1*c* which may be denominated with equal validity as the characteristic of a dual or multiple slope amplifier with the important difference that the amplification is decreased rather than increased beyond the break points.

It should be noted that the relations represented by Equations 3 to 7 are most general; they hold even if, for example, the conductance $g_0$ tended to zero, that is if the feedback were omitted (open circuited). Further, the relations hold true if the conductances $g_2$ were omitted, in which case however only the performance according to FIG. 1*d* (shunt diode) is possible. Further, conductance $g_1$ may be omitted in which case the characteristic of FIG. 1*a* degenerates to the "amplitude sensitive amplifier" function illustrated in FIG. 1*h*. Here as $e_1$ builds up from zero amplitude, the voltage $e_1$ and consequently the voltage $e_0$ remain at zero until $e_1$ overcomes the bias, whence the diodes 22 and 24 conduct and give rise to the symmetrically located, equal slope straight line segments 58*a* and 58*b*. The term "amplitude sensitive," by analogy to the term "phase sensitive" connotes sensitivity to transmit or amplify only such input voltages as exceed a minimum amplitude, and with a characteristic (58*a*, 58*b*) that is off-set from the origin, as shown in FIG. 1*h*. With conductance $g_1$ removed, but with the circuit constants selected to produce shunt diode operation, the characteristic will remain essentially as illustrated in FIG. 1*c*.

The response curves illustrated in FIGS. 1*a* and 1*c* are symmetrical for positive and negative reference phase of the input voltage $e_1$ by reason of the symmetry of the bias network 44. In some applications it is desirable to produce asymmetrical responses. This may be achieved by selecting unbalanced secondary windings for the transformer 32 or by insertion of additional resistance in series with the diodes 40 and 42. In particular such series resistance may be made infinite, that is the respective connections between diode 40 and junction 26 and between diode 42 and junction 28 are broken and the latter two diodes are removed completely. In this case only one set of alternate and balanced negative and positive half-cycle sinusoidal unidirectional bias signals are applied to the diodes 18 and 20 respectively, rather than the two sets in the case of full wave rectification. Such half wave rectified bias operation is illustrated in FIGS. 1*e* and 1*f* which correspond to FIGS. 1*b* and 1*d* in the first quadrant. Under these conditions bias is supplied only to the diode 22 during half cycles of the reference voltage +E of one polarity and only to the diode 24 during the half cycles of opposite polarity, and is absent otherwise. Such absence of bias is of no moment for the normal phase where the positive half cycle of $e_1$ coincides with the half cycle of bias application to diode 22 for series diode action and to diode 24 for shunt diode action. It can be shown for the case of series diode operation, that with $e_1$ at normal phase $e_{18}$ will be more negative than $e_i$ during the negative half cycles of $e_1$ even in the absence of bias. Similarly it can be shown in the case of shunt diode operation that with $e_1$ at normal phase, $e_i$ will be more negative than $e_{20}$ during the negative half cycles of $e_1$ even in the absence of bias. If however, $e_1$ is reversed in phase, the break occurs immediately at the origin in the case of series diode operation (FIG. 1*e*); no break occurs in the case of shunt diode operation (FIG. 1*f*). This may be readily inferred from the fact that in the former case diode 22 is rendered immediately conductive during the positive half cycles of $e_1$ owing to the then absence of bias, whereas in the latter case positive bias is applied to the junction 20 only when the voltage $e_i$ is negative, so that diode 24 cannot conduct. With reference again to FIG. 1*e* it should be noted that the third quadrant line segment 56*b'* is actually of somewhat steeper slope than the line segment 56*a'* to the right of the break point in the first quadrant. This is so because under conditions of reversed phase, when diode 22 conducts diode 36 will be nonconducting so that the conductance $g_4$ will not divert any current from the junction 18. Ultimately $e_{18}$ will build up to amplitude $e_4$ whence diode 36 will once more conduct and serve to divert current through conductance $g_4$. The just discussed effect however, is generally negligibly small so that the lines 56*a'* and 56*b'* may be taken essentially as parallel.

The asymmetrical dual slope amplifier giving rise to the characteristic illustrated in FIG. 1*f* may be modified to produce a characteristic approaching that illustrated by the heavy solid line segments 60*a* and 60*b* in FIG. 1*g*. This characteristic implies linear input-output characteristic for input signal of reversed phase, and essentially zero output for input signal of normal phase. To this end it is necessary to make the bias voltage $e_4$ of relatively small magnitude so that the break point is shifted close to the origin, and have the conductances $g_4$ approach short circuits. The "phase sensitive amplifier" characteristic of FIG. 1*g* may be produced exactly by generating in response to the same input signal $e_1$ the two asymmetrical functoins illustrated in FIGS. 1*e* and 1*f*, phase inverting one of the two functions, and combining the phase inverted function with the other originally generated function. Referring again to FIG. 1*g* the characteristic composed of the segments 62*a*, 62*b* and 62*c* is seen to match the characteristic curve illustrated in FIG. 1*e*. The characteristic curve composed of segments 64*a* and 64*b* is seen to match that of FIG. 1*f* except for reversal in phase. The break points joining the segments 64*a* and 64*b* and the segments 62*b* and 62*c* are selected to correspond to the same value of $e_1$. Further the slopes of the segments 62*b* and 64*a* and those of the segments 62*c* and 64*b* are selected to be equal and opposite.

Referring to FIG. 2, the arrangement shown therein is similar to that of FIG. 1 except that the bias network 44 shunts the feedback conductance $g_0$ rather than the input conductance $g_1$. The bias network can be arranged to provide series diode or shunt diode action. Here however series diode action results in increased feedback and therefore decreased amplification whereas shunt diode action results in decreased feedback and therefore increased amplification. The functions illustrated in FIGS. 1*c* and 1*f* may be produced by the circuitry of FIG. 2 by arranging the bias network 44 for series diode action. The conductance $g_2$ may be made large in comparison to conductance $g_1$ so that the slopes of the segments 56*a* and 56*b* of FIG. 1*c* approach zero. The characteristic of FIG. 1*c* thus approaches a limiter characteristic.

Arranging the bias network 44 of FIG. 2 for shunt diode action results in the response illustrated in FIG. 1*a*. A similar inverse of relations exists in the case of half wave bias operation, the characteristic of FIG. 1*e* applying to shunt diode operation and that of FIG. 1*f* to series diode operation. The characteristic curves may be shaped to any desired slope by varynig the interrelation of the conductances, including possible total omission of the conductances $g_0$ or $g_2$.

In the embodiment illustrated in FIG. 3 the input voltage, herein designated as $e_{in}$, is applied simultaneously to a symmetrical dual slope amplifier 65 which produces the characteristic 66 of FIG. 3*a* or FIG. 3*b*, and also to an ordinary amplifier 67 which produces the linear characteristic 68 of FIG. 3*a* or FIG. 3*d*. The amplifier 67 is arranged to provide an output of opposite phase to that of the dual slope amplifier 65 and may even degenerate simply to a resistor. The outputs of the amplifier 65 and 67 are combined in a summing amplifier 70 which may produce the heavy solid line amplitude sensitive amplifier characteristic 72 of FIG. 3*a* or the limiter characteristic 74 of FIG. 3*b*, depending upon the relation of outputs of the amplifier 65 and 67. For generation of the characteristic 72, it is necessary that the amplifier 67 have the same gain as amplifier 65 prior to the break. For generation of the limiter characteristic 74 it is necessary that the amplifier 67 have the same gain as amplifier 65 beyond the break.

The modification illustrated in FIG. 4 is an "absolute value function generator" whose response is illustrated in FIG. 4*a*. It produces an output voltage varying linearly with input voltage but of constant phase and independent of the phase (normal or reversed) of the input voltage.

The circuitry of FIG. 4 will be treated on a resistance basis rather than a conductance basis for convenience. The input voltage $e_{in}$ is applied through an input resistor $R_1$ to amplifier 14 which is provided with a feedback resistor which is also of magnitude $R_1$. The feedback resistor is shunted by a bias network 44 that is arranged for series diode action and half wave bias operation. In line with previous considerations, the output of amplifier 14 is essentially that of FIG. 1*f* except that modifications are made to approach the conditions illustrated by the line segments 60*a* and 60*b* of FIG. 1*g*. This may be accomplished in a manner analagous to that suggested for the configuration of FIG. 1, namely by choosing the bias voltage to be of relatively low magnitude so that the break point approaches the origin and by selecting the resistance $R_2$ within the network 44 (corresponding to conductances $g_2$) small in comparison with the magnitude of $R_1$.

Accordingly the amplifier 14 will deliver an output signal $-e_{in}$ for input voltages of one phase (Equation 1), and essentially zero output voltage for input signals of opposite phase. The input signal $e_{in}$ is applied through a further resistor also of magniture $R_1$ to a further summing amplifier 76 which also receives through another input resistor of magnitude $$\frac{R_1}{2}$$

the output signal of amplifier 14. The amplifier 76 is provided with a feedback resistor also of magnitude $R_1$. Owing to the proportioning of the input resistors of the amplifier 76, when the input signal $e_{in}$ is of the phase rendering amplifier 14 transmissive, the output signal of amplifier 76 will be, in view of Equation 1, $$e_0=-e_{in}+2e_{in}=e_{in}$$

When the input signal reverses in phase, that is becomes $-e_{in}$, amplifier 14 will be non-transmissive and the output voltage of amplifier 76 will be simply $+e_{in}$. The "phase discriminating" response of amplifier 14 (FIG. 4) may alternatively be generated by combination of the response illustrated in FIG. 1*e* and FIG. 1*f* as previously suggested by utilizing the circuitry of either FIG. 1 or FIG. 2.

From the aforegoing it will be seen that a variety of response curves may be generated by the several forms of the invention described. The method and means of the invention may be extended to produce characteristic curves with additional break points by cascading of function generators. By increasing the number of stages in the cascade and by locating the successive break points arbitrarily closely, the composite response curve may be made to approach a continuous smooth curve. Since the described method and apparatus lend themselves to generation of multiple slope functions of both increasing and decreasing slopes a cascade of generators may be arranged to produce curves exhibiting maxima and minima and inflection points. As a further modification the circuitry of FIG. 2, arranged for full wave bias-series diode action may be utilized as an amplifier having high gain for input voltages in phase or phase opposition to the bias voltage, but having low gain for quadrature voltages. To this end the amplitude of the bias voltage is made relatively high, so that the symmetrically break points are beyond the normally anticipated range of operation. Accordingly the bias network provides no additional feedback for the normal in phase or phase opposition input signals or components thereof. With respect to quadrature signals or signal components the bias network provides additional feedback. This may be readily inferred from the fact that the zeros of the bias voltages coincide with the crests of the quadrature voltages, so that these crests do not encounter opposing bias and are therefore fed back. The feedback is thus most pronounced in the crests of the quadrature voltages and essentially absent at the zeros of the quadrature voltages. This results in distortion of the output signal, which may be removed by insertion of a filter intermediate of the bias network and the input junction.

It should be understood that this invention is not limited to specific details of construction and arrangement thereof herein illustrated, and that changes and modifications may occur to one skilled in the art without departing from the spirit of the invention.

As used in the claims and in the proper context, a recital to the effect that the output signal has the same frequency and waveshape as the input signal shall include output signals of zero magnitude as reflected by the curves in the FIGS. 1*g*, 1*h*, and 3*a* for example.

What is claimed is:

1. A function generating system for producing, as a function of an alternating input signal of continuously variable magnitude and reversible phase applied to an input terminal of said system, an alternating output signal having the same frequency and waveshape as said input signal, said function including at least two intersecting straight lines defining different linear input-output signal relations, said system comprising an amplifier having an input and an output terminal and producing said output signal at said output terminal, a bias network including a first and a second diode, the cathode electrode of said first diode and the anode electrode of said second diode being directly connected to said amplifier input terminal, and further including means for applying through respective resistors to the anode electrode of said first diode and the cathode electrode of said second diode respectively, at least one set of alternate and balanced negative and positive time-varying unidirectional bias signals which have waveshapes essentially the same as the input signal during its negative and positive half cycles respectively and which are of the same frequency and in synchronism with said input signal, and two like resistors interconnecting said system input terminal and respectively, the anode electrode of said first diode and cathode electrode of said second diode, whereby to generate one or another of said straight line relations in accordance with the relation of magnitudes of said input and bias signals.

2. A function generating system for producing, as a function of an alternating input signal of continuously variable magnitude and reversible phase applied to an input terminal of said system, an alternating output signal having the same frequency and waveshape as said input signal, said function including at least two intersecting straight lines defining different linear input-output signal relations, said system comprising an amplifier having an input and an output terminal and producing said output signal at said output terminal, a bias network including a first and a second diode, the cathode electrode of said first diode and the anode electrode of said second diode being directly connected to said amplifier input terminal, and further including means for applying through respective resistors to the anode electrode of said first diode and the cathode electrode of said second diode respectively, at least one set of alternate and balanced negative and positive time-varying unidirectional bias signals which have waveshapes essentially the same as the input signal during its negative and positive half cycles respectively and which are of the same frequency and in synchronism with said input signal, a resistor interconnecting said system input terminal and amplifier input terminal, and two like resistors interconnecting said system input terminal and respectively, the anode electrode of said first diode and cathode electrode of said second diode, whereby to generate one or another of said straight line relations in accordance with the relation of magnitudes of said input and bias signals.

3. A function generating system for producing, as a function of an alternating input signal of continuously variable magnitude and reversible phase applied to an input terminal of said system, an alternating output signal having the same frequency and waveshape as said input signal, said function including at least two intersecting straight lines defining different linear input-output signal relations, said system comprising an amplifier having an input and an output terminal and producing said output signal at said output terminal, a bias network including a first and a second diode, the cathode electrode of said first diode and the anode electrode of said second diode being directly connected to said amplifier input terminal, and further including means for applying through respective resistors to the anode electrode of said first diode and the cathode electrode of said second diode respectively, at least one set of alternate and balanced negative and positive time-varying unidirectional bias signals which have waveshapes essentially the same as the input signal during its negative and positive half cycles respectively and which are of the same frequency and in synchronism with said input signal, a resistor interconnecting said system input terminal and amplifier input terminal, and two like resistors interconnecting said amplifier output terminal and respectively, the anode electrode of said first diode and cathode electrode of said second diode, whereby to generate one or another of said straight line relations in accordance with the relation of magnitudes of said input and bias signals.

4. A function generating system for producing, as a function of an alternating input signal of continuously variable magnitude and reversible phase applied to an input terminal of said system, an alternating output signal having the same frequency and waveshape as said input signal, said function including at least two intersecting straight lines defining different linear input-output signal relations, said system comprising an amplifier having an input and an output terminal and producing said output signal at said output terminal, a bias network including a first and a second diode, the cathode electrode of said first diode and the anode electrode of said second diode being directly connected to said amplifier input terminal, and further including means for applying through respective resistors to the anode electrode of said first diode and the cathode electrode of said second diode respectively, at least one set of alternate and balanced negative and positive time-varying unidirectional bias signals which have waveshapes essentially the same as the input signal during its negative and positive half cycles respectively and which are of the same frequency and in synchronism with said input signal, a resistor interconnecting said system input terminal and amplifier input terminal, a feedback resistor interconnecting said amplifier output and input terminals, and two like resistors interconnecting said amplifier output terminal and respectively, the anode electrode of said first diode and cathode electrode of said second diode, whereby to generate one or another of said straight line relations in accordance with the relation of magnitudes of said input and bias signals.

5. A function generating network for producing at a network output terminal, as a function of an alternating network-input signal of continuously variable magnitude and reversible phase applied to an input terminal of said network, an alternating network-output signal having the same frequency and waveshape as said input signal, said function including at least two intersecting straight lines defining different linear input-output signal relations, said function generating network comprising a bias circuit including a first and a second diode, the cathode electrode of said first diode and the anode electrode of said second diode being connected together and constituting said network output terminal, and further including bias application circuitry for applying through respective resistors to the anode electrode of said first diode and the cathode electrode of said second diode respectively, at least one set of alternate and balanced negative and positive time-varying unidirectional bias signals which have wave-shapes essentially the same as the input signal during its negative and positive half cycles respectively and which are of the same frequency and in synchronism with said input signal, and a pair of like resistors interconnecting said network input terminal and respectively the anode electrode of said first diode and the cathode electrode of said second diode, whereby to generate one or another of said straight line relations in accordance with the relation of magnitudes of said input and bias signals.

References Cited in the file of this patent

UNITED STATES PATENTS

| | | |
|---|---|---|
| 2,508,622 | Pierce | May 23, 1950 |
| 2,721,308 | Levy | Oct. 18, 1955 |
| 2,832,886 | Morrill | Apr. 29, 1958 |
| 2,871,349 | Shapiro | Jan. 27, 1959 |
| 2,896,082 | Raymond et al. | July 21, 1959 |
| 2,899,550 | Meisinger et al. | Aug. 11, 1959 |

FOREIGN PATENTS

| | | |
|---|---|---|
| 675,338 | Great Britain | July 9, 1952 |
| 693,085 | Great Britain | June 24, 1953 |
| 763,237 | Great Britain | Dec. 12, 1956 |

OTHER REFERENCES

Wass: Introduction to Electronic Analogue Computors, McGraw-Hill, New York, 1955, pages 145–147 relied on.

Cohen et al.: "A.C. Diode Proceedings of National Simulation Council," December 1957 (page 7.0 to 7.14).